Nov. 19, 1929.  H. NYQUIST  1,735,933
METHOD OF TESTING TELEGRAPH TRANSMISSION
Filed Jan. 20, 1928
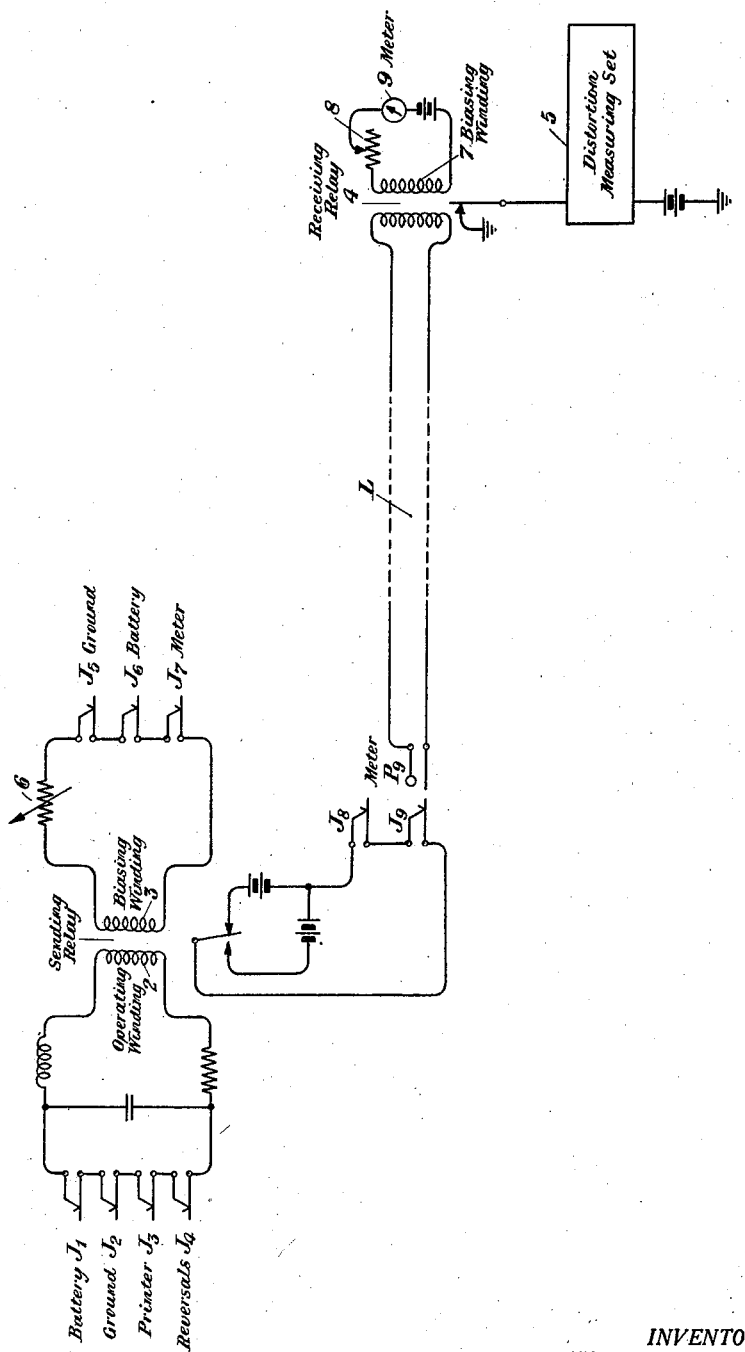
INVENTOR.
H. Nyquist
BY
ATTORNEY Patented Nov. 19, 1929

1,735,933

UNITED STATES PATENT OFFICE

HARRY NYQUIST, OF MILLBURN, NEW JERSEY, ASSIGNOR TO AMERICAN TELEPHONE AND TELEGRAPH COMPANY, A CORPORATION OF NEW YORK

METHOD OF TESTING TELEGRAPH TRANSMISSION

Application filed January 20, 1928. Serial No. 248,100.

This invention relates to telegraph systems and more particularly to improvements in methods of and means for measuring telegraph transmission by employing distorted signals rather than perfect signals.

In former methods of measuring telegraph transmission, which have been utilized, so-called "perfect signals" are usually employed at the sending end of the circuit and the lengthening or shortening of these signals due to imperfections of the circuit is measured at the receiving end. These measurements are sometimes made at several speeds, and, in addition, a measurement may be made with a speed-of-failure meter. A fairly complete picture of the quality of transmission afforded by the circuit may be obtained by such methods. However, it has been found that such a procedure is somewhat complicated for use in connection with field transmission maintenance, and accordingly, the primary object of the present invention is to provide a much simpler procedure for measuring telegraph transmission which involves measurements at only a single speed such as the normal speed of operation and the utilization of distorted signals rather than perfect signals. Other features and objects of the invention will appear more fully from the detailed description thereof hereinafter given.

With reference to the distorted signals utilized in the arrangements of this invention, the question arises as to which component or components of distortion should be used. It is pointed out that with this invention it is possible to provide suitable circuits for introducing either bias, characteristic or fortuitous components or any combination of these into the signals to produce the type of distorted signal desired. However, it is probably more convenient to measure and to control bias than either of the other two components. Also, bias is a common cause of poor transmission and is comparatively easy to correct for in the field operation of telegraph circuits. Accordingly, in the testing method and arrangements of this invention, bias is introduced into the signals to produce the desired distorted type of signal utilized. However, the signals may be distorted by other means.

The telegraph transmission measuring method of the present invention in which distorted signals are used, involves introducing distortion into the signals either in pre-determined amounts or in gradually increasing amounts and measuring the effect thereof at a recording device, such as a distortion measuring set, at the receiver. This method has an advantage over methods involving the use of undistorted signals in that it affords a direct indication of the margin in transmission, i. e., of the ability of the circuit to handle distorted signals (so as to determine the amount of distortion which may be added to the received signals before the total distortion becomes excessive).

In the method of this invention the distortion may be impressed at the receiving end of the circuit in order to determine the margin at the receiving end. In other words the measurement of margin by impressing distortion on the signals at the receiving end will afford an idea of the permissible variation in the circuit. The testing method of the invention makes it readily possible to ascertain how much distortion may be introduced in the signals during transmission over the circuit before the receiving apparatus will fail to properly function.

The invention may be more fully understood from the following description, together with the accompanying drawing, in the figure of which is shown a circuit diagram of a telegraph system to which the testing method and apparatus of this invention are applicable.

In the drawing is shown a transmission line L interconnecting a transmitting and receiving station. At the transmitting station is shown a portable test set for use with the arrangements of the invention. This test set includes the jacks $J_2$ to $J_9$, inclusive. Battery and ground may be connected to jacks $J_1$ and $J_2$. A telegraph printer sending distributor may be connected to jack $J_3$ and a source of reversals may be connected to jack $J_4$. These jacks are connected to the operating winding 2 of a sending relay which is of the polar type. Connected to the biasing winding 3 of the sending relay is a variable resistance 6 and the jacks $J_5$, $J_6$, and $J_7$ to which may be connected, respectively, battery, ground, and a meter. Connected in series with winding 2 is a retardation coil and a current limiting resistance. A condenser is bridged across the winding 2. The action of this inductance and condenser is to round off the wave shape of the signals through the relay winding when the circuit is opened and closed by the printer sending contacts which may be connected to jack $J_3$. When rounded off signals are sent through winding 2, signals with bias varying from about 66 per cent spacing to 66 per cent marking may be obtained from the relay contacts by varying the direct current flowing through biasing winding 3 by changing the variable resistance 6. The sending relay contacts are connected to the jacks $J_8$ and $J_9$. A meter may be connected to jack $J_8$, and the plug $P_9$ connected to a line circuit L may be connected to jack $J_9$. The sending arrangements which have been illustrated are particularly useful in practice. However, any other desirable form of telegraph sending apparatus might equally well be utilized with the arrangements of this invention. The line circuit L is connected to the winding of a receiving relay 4. The contact of receiving relay 4 controls a circuit through the distortion measuring set 5. The distortion measuring set 5 is well known in the art and is more completely illustrated in Patent No. 1,628,392, May 10, 1927, to S. I. Cory. Accordingly, it is only illustrated in schematic form herein. However, other forms of recording devices, such as a speed-of-failure meter, a Wheatstone recorder, or a printer might be used with the method of this invention. The receiving relay 4 will be provided with a biasing winding 7 in series with which is a variable resistance 8, a meter 9, and a battery. By changing the variable resistance 8 any desired amount of bias may be introduced into the signals at the receiving relay 4.

The testing method of this invention, the purpose of which is to determine the margin at the receiving end of the circuit, or, in other words, to determine how much distortion may be introduced in the signals during transmission over the circuit before the receiving station will fail to properly function, is as follows: A source of reversals, or perfect signals, may be connected to jack $J_4$ and these perfect signals may be sent over the line L. A reading will then be taken on the distortion measuring set 5. This will show the amount of distortion inherent in the line itself, or, in other words, just how much distortion will be introduced into perfect signals by transmission over the particular line in question. The variable resistance 8 may then be adjusted to introduce distortion in the form of bias into the signals at the receiving end of the line. In accordance with the arrangements of this invention, the amount of distortion introduced in the form of bias in the signals may be gradually increased until the distortion measuring set 5 indicates that the maximum amount or limit has been reached at which the receiver will properly function. Such maximum amount or limit will have been previously determined by experiment. The distortion measuring set 5 will indicate the per cent of distortion or bias in the signals. For purposes of illustration let it be assumed that it has been determined by experiment that with 50 per cent distortion, as shown by set 5, the signals will operate the receiver, but will not do so beyond this limit. Accordingly, if the bias is gradually increased at the receiving station until device 5 gives an indication of such limit, then a reading of the bias introduced at such time will give a direct indication of just how much bias may be introduced in the signals before the receiver fails to operate. The limit for the amount of distortion may be previously determined by experiment as has been pointed out and may differ for various types of signals. In other words, the amount of distortion that manual signals might stand might be different from that in the case of printer signals. The testing method might also be slightly varied by introducing at the receiver a fixed and arbitrary amount of bias instead of gradually increasing amounts. Upon the introduction of a fixed and known amount of bias a reading would be taken on meter 5. A comparison of this reading with the known maximum limit in per cent would make it easily possible to determine how much more or less than the fixed and arbitrary amount of bias might be introduced.

While the invention has been disclosed in certain specific arrangements which are deemed desirable, it is understood that it is capable of embodiment in many and other widely varied forms without departing from the spirit of the invention as defined by the appended claims.

What is claimed is:

1. The method of testing transmission in a telegraph circuit interconnecting a transmitting and a receiving station which comprises introducing distortion at the receiving station into the signals received thereat, measuring the distortion in such signals, and comparing this measurement and the amount of distortion introduced with the known maximum allowable distortion for such signals.

2. The method of testing transmission in a telegraph circuit interconnecting a transmitting and a receiving station which comprises introducing distortion at the receiving station into the signals received thereat, measuring the distortion in such signals, and gradually increasing said introduced distortion until said measurements indicate the known maximum allowable distortion for such signals.

3. A telegraph testing system comprising a line circuit interconnecting a transmitting and receiving station, means at said transmitting station for sending perfect signals over said line, a receiving relay at said receiving station, an adjustable biasing circuit for said receiving relay, a circuit controlled by said relay, and a distortion measuring set in said circuit.

In testimony whereof, I have signed my name to this specification this 18th day of January, 1928.

HARRY NYQUIST.